Figure 1:
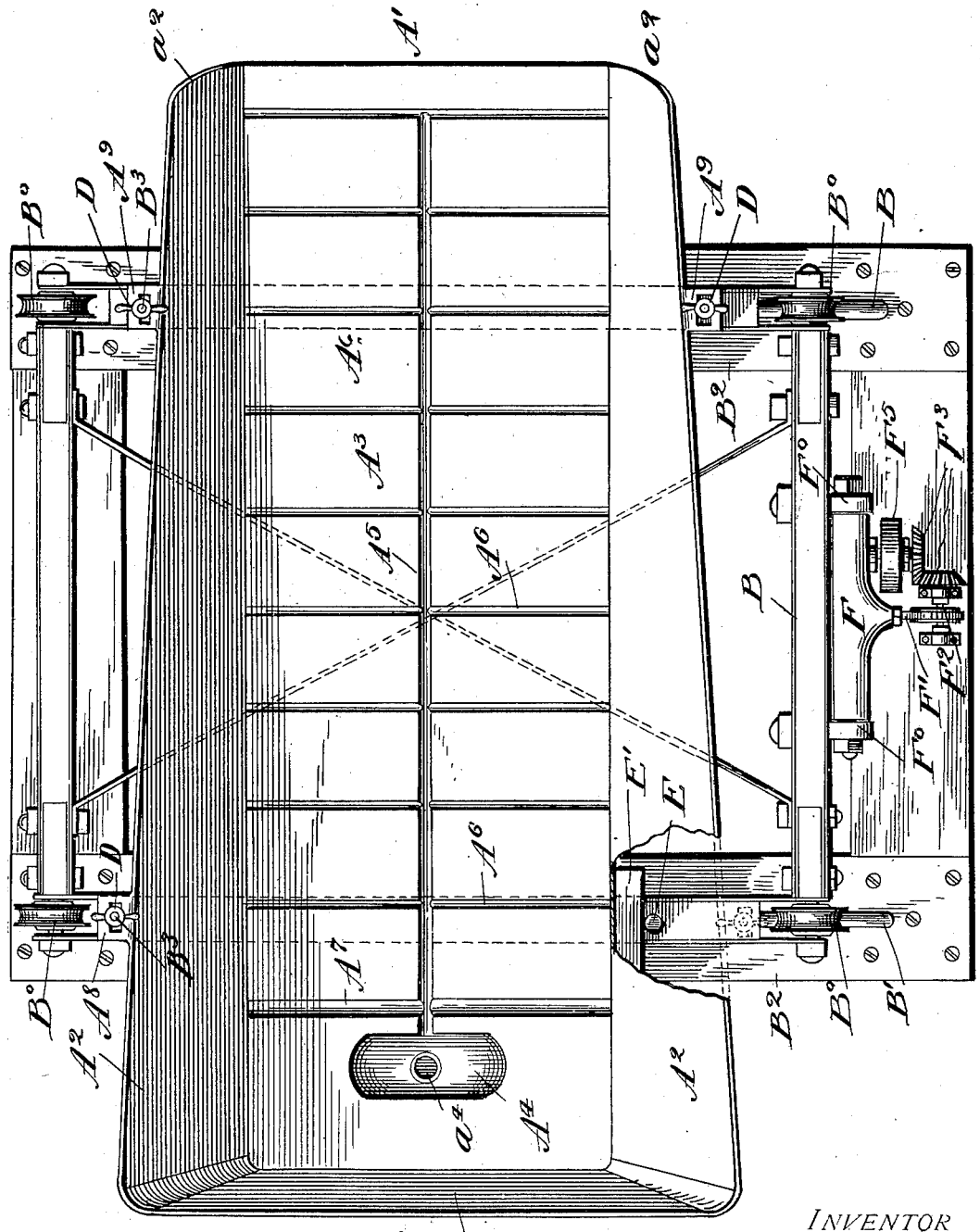

No. 663,717. Patented Dec. 11, 1900.
C. BARWICK.
GOLD MINING OR PLACER MACHINE.
(Application filed May 3, 1900.)
(No Model.) 2 Sheets—Sheet 1.

WITNESSES:
L. C. Hills
John Chalmers

INVENTOR
Charles Barwick
By Johnson & Fisher
Attorneys

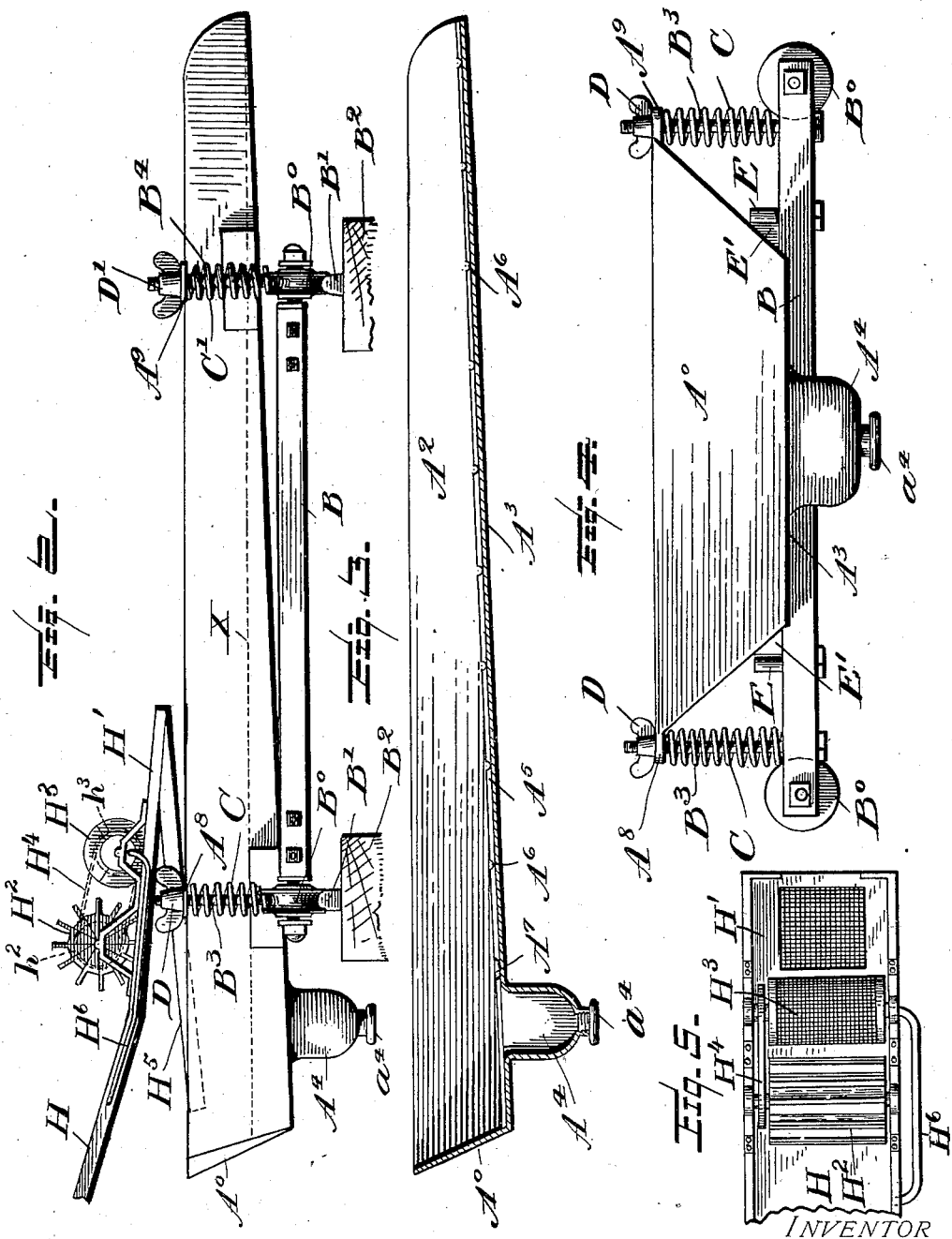

UNITED STATES PATENT OFFICE.

CHARLES BARWICK, OF DENVER, COLORADO.

GOLD-MINING OR PLACER MACHINE.

SPECIFICATION forming part of Letters Patent No. 663,717, dated December 11, 1900.

Application filed May 3, 1900. Serial No. 15,386. (No model.)

*To all whom it may concern:*

Be it known that I, CHARLES BARWICK, a citizen of the United States, residing at Denver, in the county of Arapahoe and State of Colorado, have invented certain new and useful Improvements in Gold-Mining or Placer Machines; and I do hereby declare the following to be a full, clear, and exact description of the invention, such as will enable others skilled in the art to which it appertains to make and use the same.

My invention relates to improvements in machines for washing auriferous ores and separating the "values" therefrom; and it has for its object to provide a machine whereby the washing and separating of the values from the gangue and other refuse is more readily and thoroughly accomplished than by machines of this sort now commonly in use for this purpose.

My invention consists principally in the novel construction and arrangement of the vibrating pan, hereinafter described and claimed, as well as its mounting.

My invention will be understood by reference to the accompanying drawings, wherein the same parts are indicated by the same letters of reference throughout the several views.

Figure 1 represents a top plan view of a pan and its supports constructed according to my invention. Fig. 2 is a side elevation of the parts shown in Fig. 1, with the addition of a portion of the discharge end of the sluice-box. Fig. 3 is a central longitudinal section through the concentrating-pan, and Fig. 4 is a rear elevation of the concentrating-pan and its movable supports. Fig. 5 is a plan view of the screen at the end of the sluice.

The concentrating-pan A is formed in somewhat the shape of a trough, having one closed end $A^0$, at which end the pan has its greatest depth, and one open end $A'$, at which end said pan has its least depth. The sides $A^2 A^2$ are similarly formed of a width at the closed end $A^0$ equal to that of the depth of the pan at said end and narrowing gradually toward the opposite end $A'$, at which end said sides $A^2$ are preferably rounded over to the edge of the bottom of the pan, as seen in the drawings. The bottom $A^3$ of the concentrating-pan is flat and is provided with a series of grooves, preferably in the form of corrugations. Where a sheet-metal pan is used, the arrangement of the grooves is best shown in Fig. 1. Near the deep end of the said pan the bottom $A^3$ has a well $A^4$, located, preferably, centrally of the bottom of the pan and provided with a removable closure, such as a screw-plug $a^4$, as seen most clearly in Fig. 3.

Referring again to Fig. 1, it will be seen that I provide a central longitudinal groove or channel $A^5$, which leads from a point near the open end $A'$ of the pan to the said well $A^4$ near the opposite closed end. I also provide a succession of transverse grooves or channels $A^6$, which communicate along the central longitudinal line of the bottom of the pan with the said central groove or channel $A^5$. The grooves $A^6$ are preferably more shallow and smaller than the central groove $A^5$; but near the well $A^4$, I preferably provide a transverse groove $A^7$ of greater width and depth than the grooves or channels $A^6$.

The sides $A^2 A^2$ and the closed end $A^0$ of the pan A are preferably inclined outwardly, as shown, and upon the edges of the sides are formed perforated lugs $A^8 A^9$, arranged in pairs, for the passage of bolts, hereinafter described, for securing the pan to its vibrating support.

The pan is supported upon a wheeled truck or skeleton platform B, the wheels $B^0$ of which are mounted upon tracks $B'$, fixed upon suitable base-timbers $B^2$, as seen in Figs. 1 and 2 of the drawings. Pairs of bolts $B^3$ and $B^4$, passing upwardly through the side members of the wheeled truck or platform B, engage the pairs of lugs $A^8 A^9$ on the sides of the concentrating-pan A. Coiled springs C and $C'$ are fitted over these bolts and confined between the said lugs $A^8 A^9$ and the side members of the wheeled truck or platform upon which the said springs rest, and the pan is secured in this position by means of thumb-nuts D and $D'$, which are screwed down over the ends of the bolts $B^3$ and $B^4$ upon the said lugs $A^8 A^9$. The bottom of the pan near its deep end may rest upon one of the side members of the truck or platform, while the pan near its open end would be entirely out of contact with the truck or platform. The springs $C'$ entirely support the open end of the pan, and the inclination of the bottom of the pan may be varied at will by adjusting the thumb-nuts D' on the bolts B⁴.

In operation the pan is adjusted with its open end about two or three or more inches, as desired, above the plane of the closed end of the pan, so that in operation the water-line would be approximately as indicated by the dotted line X in Fig. 2.

Stops E on the wheeled platform or truck, engaging the blocks E' on the sides of the concentrating-pan and allowing of vertical movement of the pan between the said stops, are provided for preventing too great lateral motion of the pan when the machine is in operation.

The wheeled platform or truck is given short rapid vibrations to and fro along the rails B' by any suitable pitman connections with any suitable or convenient source of power.

In Fig. 1, F represents a frame pivoted at its ends in lugs F⁰. One of the end members of the frame B and this frame F is connected to a strap F', inclosing an eccentric F², driven through intermeshing gears F³ and F⁴, by means of a pulley F⁵, connected with a belt from any suitable source of power.

The gearing and connections for vibrating the wheeled platform or truck B, carrying the concentrating-pan, of whatever form or arrangement, should be so arranged as to impart short but rapid vibration to the said platform or truck.

The apparatus herein described and shown is for use particularly in placer-mining, and the washings are delivered to the concentrating-pan A at the closed end thereof, where the pan is deepest. In this way the heavier particles of gold may fall to the bottom of the concentrating-pan and by the vibration of the latter be caused to fall into the well A⁴. The lighter particles of ore mixed with dirt or gangue will be carried along toward the open end of the pan, and by reason of the vibration of the pan and the agitation of the water therein any particles of gold that may adhere to the lighter particles of waste matter will be separated and will fall to the bottom of the pan and will pass into the grooves or channels A⁶ and thence through the channel A⁵ to the well or receptacle A⁴, the heavier particles gravitating by their own weight toward the lower closed end of the pan. The water and all like material will be passing constantly over the open end of the pan, while the sand and gravel will be deposited to some extent upon the bottom of the pan; but the inclination of the bottom being so slight the constant agitation of the pan and the mass of water and solid matter therein will keep the particles of sand and gravel moving, so that the latter cannot accumulate to a depth sufficient to impede the free movement and gravitation of the heavier particles of gold.

In Figs. 2 and 5, H represents the sluice for conveying the water to the concentrator. At the end of this sluice is a sluice-box H', in which is mounted an undershot paddle-wheel H², which is revolved by the flow of the water and which drives the rotary screen H³ by means of a belt H⁴, passing over pulleys h² and h³ on shafts of the said paddle-wheel and rotary screen, respectively. In the bottom of the sluice-box H', near its lower end, is a screen through which the fine particles of ore pass into the rearwardly-inclined trough H⁵ and thence downwardly and are discharged into the rear end of the concentrating-pan A. The boulders and coarse gravel pass out of one end of the rotary screen and are carried off in any suitable way, leaving the finer particles of sand and ore to pass through the meshes of the said screen and thence, as described, into the concentrating-pan. The meshes of the screen are kept clear by a current of water induced into the screen through a pipe H⁶, connected at its upper end with the sluice and taking water therethrough, said pipe discharging through a spraying device of any suitable arrangement with the said rotary screen.

Having thus described my invention, what I claim as new, and desire to secure by Letters Patent of the United States, is—

1. In an apparatus for washing and concentrating ores, the combination with a reciprocating frame, of a concentrating-pan provided with a closed end and an open end mounted transversely of the said frame, and set at an inclination downward from the said open end; a well or pocket in the bottom of said pan near its closed end, a longitudinal channel in the said bottom leading to the said well or pocket; transverse channels leading to the said longitudinal channel; perforated lugs on the side edges of the said pan, screw-threaded bolts mounted in the said frame and engaging the said perforated lugs; coiled springs interposed between the said lugs and the said frame and surrounding said bolts; and thumb-nuts engaging the ends of the said bolts for adjusting the inclination of the said pan upon the said frame, substantially as described.

2. In an apparatus for washing and concentrating ores, the combination with a reciprocating frame, of a concentrating-pan provided with a closed end and an open end mounted transversely of the said frame, and set at an inclination downward from the said open end; a well or pocket in the bottom of said pan near its closed end, a longitudinal channel in the said bottom leading to the said well or pocket; transverse channels leading to the said longitudinal channel; perforated lugs on the side edges of the said pan, screw-threaded bolts mounted in the said frame and engaging the said perforated lugs; coiled springs interposed between the said lugs and the said frame, and surrounding said bolts; and thumb-nuts engaging the ends of the said bolts for adjusting the inclination of the said pan upon the said frame; stops permitting of vertical adjustment of the said pan, but preventing lateral movement thereof with respect to the said frame, substantially as described.

3. In an ore washing and concentrating machine, the combination with a reciprocating support, of a concentrating-pan having a substantially rectangular oblong bottom, and outwardly-inclined closed sides and one end, and one open end, and having in its bottom near the closed end, a well or pocket provided with a removable bottom-closure; a longitudinal channel leading from the vicinity of the open end communicating with the said well or pocket; transverse channels communicating with said longitudinal channel; slotted lugs or ears upon the side edges of the said pan; means for engaging the said slotted lugs and permitting adjustment of the inclination of the said pan upon its supporting-frame; and means for reciprocating the said frame transversely of the direction of passage of water therethrough, substantially as described.

In testimony whereof I affix my signature in presence of two witnesses.

CHARLES BARWICK.

Witnesses:
C. W. DALQUIST,
HENRY HILMER.